Sept. 30, 1969  R. L. AVERY  3,469,485
OSCILLATING CUT-OFF MACHINE
Filed Jan. 3, 1967  2 Sheets-Sheet 1
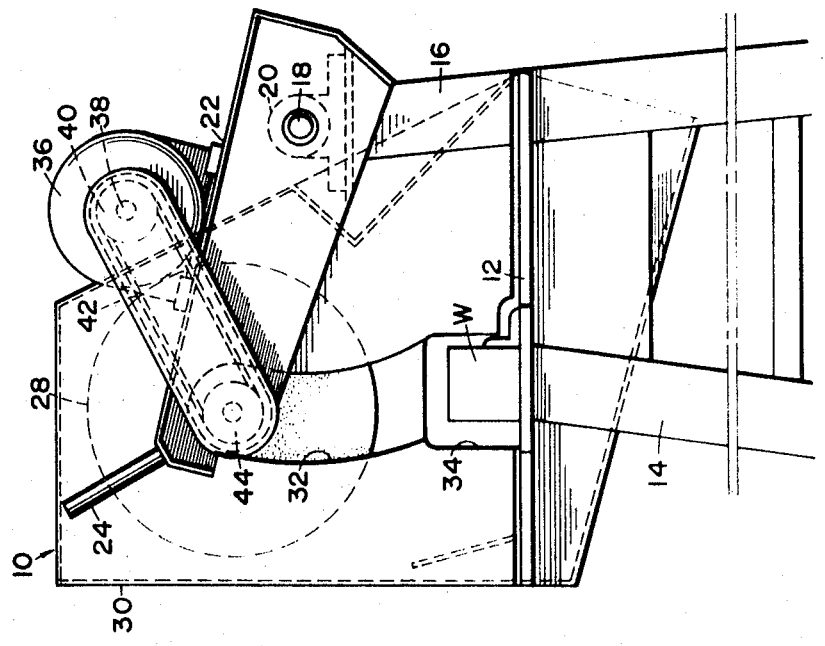
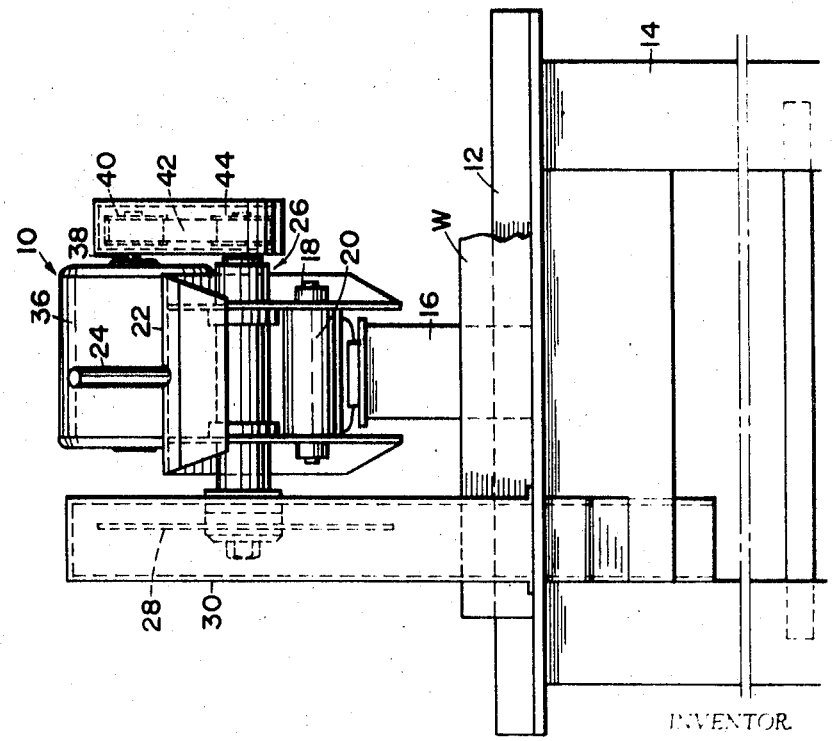
INVENTOR
RALPH L. AVERY
BY Sept. 30, 1969 R. L. AVERY 3,469,485
OSCILLATING CUT-OFF MACHINE
Filed Jan. 3, 1967 2 Sheets-Sheet 2
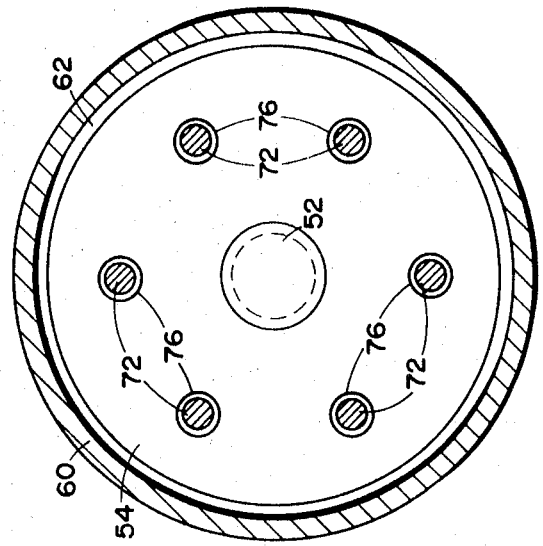
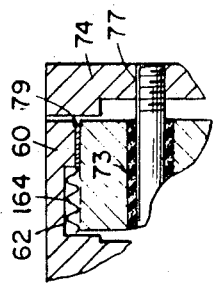
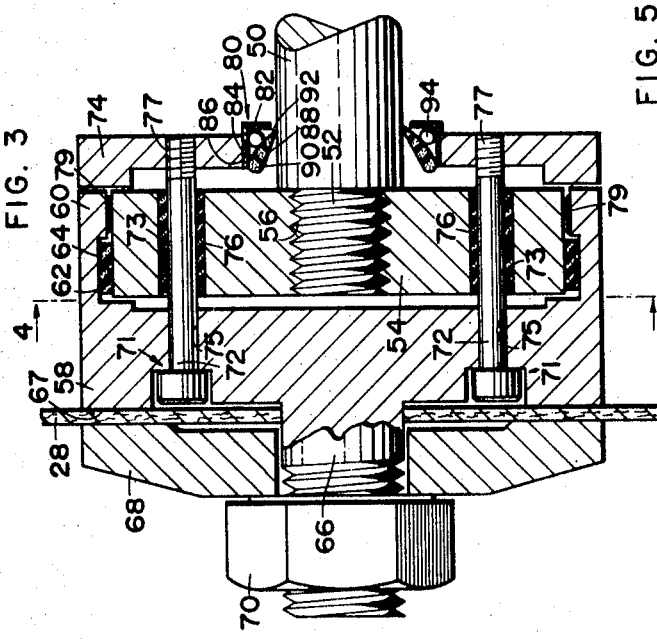
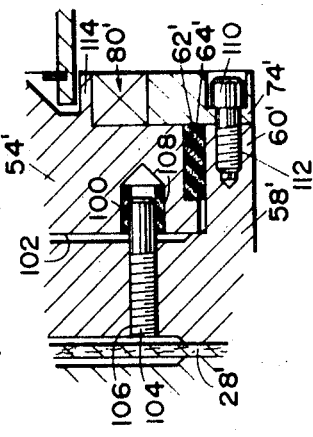
INVENTOR.
RALPH L. AVERY
BY

United States Patent Office 3,469,485
Patented Sept. 30, 1969

3,469,485
OSCILLATING CUT-OFF MACHINE
Ralph L. Avery, Buffalo, N.Y., assignor to The Carborundum Company, Niagara Falls, N.Y., a corporation of Delaware
Filed Jan. 3, 1967, Ser. No. 606,719
Int. Cl. B23d 19/00; B26d 1/14
U.S. Cl. 83—491
11 Claims

ABSTRACT OF THE DISCLOSURE

A vibrating spindle assembly for a cut-off tool having a clearance space between a drive member and the radial flange of a driven member to provide radial oscillatory movement therebetween. Clearance shims may be selectively employed to adjust this clearance space. A strip of yieldable material is disposed in the clearance space to maintain the drive and driven members in coaxial alignment when the tool is not engaged with a workpiece. A dust-proof seal assembly prevents foreign matter from entering into the spindle assembly.

This invention relates to improvements in cut-off machines and, more particularly, to a vibrating spindle assembly used on such machines.

In a cut-off machine of a known type, a rotatable cut-off tool or wheel is mounted on a drive spindle in such a manner so as to permit bodily transverse movement of the wheel relative to the axis of the spindle shaft in order to effect oscillation of the cut-off wheel during operation. It has been discovered that oscillating a cut-off wheel increases the cutting action of the wheel and facilitates the removal of chips from the kerf being formed.

Although these prior known cut-off machines have served the purposes for which they were designed, they have not been satisfactory under all conditions of operation due to their inability to perform efficiently in dusty environments. Furthermore, relative movement between the driving flange and the adapter ring which supports the cut-off wheel produces excessive vibrations and noise when not cutting.

The general purpose of the present invention is to overcome the above disadvantages by providing a vibrating spindle having novel dust-proof means, self-centering means, and means for controlling the clearance between relative moving parts.

It is therefore an object of the present invention to provide a new and improved cut-off machine.

It is another object of the present invention to provide a new and improved cut-off machine having a novel vibrating spindle assembly.

It is a further object of the present invention to provide a new and improved cut-off machine having a novel vibrating spindle assembly including means for precluding dust contamination between relative moving parts.

It is still another object of the present invention to provide a new and improved cut-off machine having a novel vibrating spindle assembly including means for maintaining the cut-off wheel adapter flange self-centered when not in engagement with the work.

It is still a further object of the present invention to provide a new and improved cut-off machine having a novel vibrating spindle assembly including means for selectively controlling the amplitude of the vibrations induced in the cut-off tool.

These and other objects of the invention will become more apparent upon consideration of the following detailed description thereof when taken in conjunction with the following drawings, in which:

FIG. 1 is a front elevational view of a cut-off machine in which a preferred illustrative embodiment of the invention is incorporated;

FIG. 2 is a side elevational view of the cut-off machine of FIG. 1;

FIG. 3 is a longitudinal section taken through the spindle assembly constructed in accordance with the principles of this invention;

FIG. 4 is a cross-sectional view taken through the spindle assembly on the plane of line 4—4 of FIG. 3; and FIG. 5 is a fragmentary sectional view of another embodiment of the spindle assembly of this invention.

FIG. 6 is a fragmentary view similar to FIG. 3 illustrating a variation in centering means for maintaiinng the blade and mounting coaxial.

Referring now to these drawings, it may be noted that the invention is, by way of illustration, incorporated in a cut-off machine, generally designated 10, having a worktable 12 suitably supported on a base 14. Extending upwardly from worktable 12 is a standard 16 having a pivotable shaft 18 suitably journaled in a bearing block 20. An arm 22 is mounted adjacent one end thereof on shaft 18 for swinging movement therewith and is provided with a handle 24 adjacent the opposite end of said arm. Suitably mounted adjacent the end of arm 22 remote from shaft 18 is a vibrating spindle assembly, generally designated 26 and hereinafter more fully described, for supporting a cut-off wheel 28 for rotary movement therewith.

Mounted onto worktable 12 is a guard 30 adjacent cut-off wheel 28 for confining flying debris resulting from the cutting operation. An arcuate upwardly extending slot 32 is provided in one side of the guard 30 for receiving spindle assembly 26 and permitting the raising and lowering thereof upon swinging movement of arm 22 about the axis of shaft 18. The guard is also provided with openings 34 on both sides of said guard adjacent worktable 12 to accommodate the passage of workpieces W therethrough.

Suitably supported on arm 22 is an electric motor 36 having a power shaft 38 to which is rigidly secured a drive pulley 40. An endless belt 42 is trained about drive pulley 40 and a pulley 44 suitably connected to the spindle assembly 26 for rotating the same.

Referring now to FIGS. 3 and 4 of the drawings, it will be seen that spindle assembly 26 comprises a rotatable spindle shaft 50 suitably journaled in bearings (not shown) at one end thereof and provided with an externally threaded portion 52 at the other end. A drive flange member 54 is provided with an internally threaded bore 56 for suitably receiving the threaded portion 52 of spindle shaft 50.

An adapter ring or driven member 58 is provided with a radial flange 60 which extends over the periphery of drive flange 54 and is radially spaced therefrom in accordance with the maximum amplitude of oscillation desired of the adapter ring 58 and hence the cut-off wheel relative to drive flange 54. Flange 60 of adapter ring 58 is provided with an annular recess 62 for receiving a flexible, yieldable, resilient rubber centering strip 64 disposed circumferentially about the periphery of drive flange 54 to maintain the cut-off wheel 28 and flange 54 in a coaxial relationship and prevent vibration of the cut-off wheel when idling, that is, when the cut-off wheel is not in engagement with the work. It should be realized that the principles of this invention envisage the use of any flexible resilient means, such as a spring or a corrugated strip of metal as shown at 164 in FIG. 6 for example, in lieu of the rubber strip, if desired.

Adapter ring 58 has an axially extending hub 66 upon which the cut-off wheel 28 is mounted. The wheel is secured against the outer face 67 of adapter ring 58 by a forward flange 68 and a nut 70 threaded on the periphery of the threaded end portion of hub 66.

The drive flange 54 is connected with the adapter ring 58 by means of a plurality of connecting assemblies, generally designated 71, comprising a plurality of axially extending bolts 72 circumferentially spaced at intervals around flange 54 and ring 58, as shown in FIG. 4. Each of the bolts 72 extends through a bore 73 of drive flange 54 and a bore 75 of adapter ring 58 and has a threaded connection 77 with a clamp ring 74 located adjacent the rearward face of drive flange 54. Surrounding each bolt 72 is a bushing 76, preferably formed of suitable yieldable material such, for example, as soft rubber and disposed within bore 73 extending through the drive flange 54 for permitting relative movement between drive flange 54 and bolt 72. Although preferably six connecting assemblies are employed in the spindle assembly and circumferentially spaced equally therearound as shown in FIG. 4, it should be appreciated that the principles of this invention contemplate the use of any suitable number of these assemblies arranged in any suitable pattern, as desired.

In order to control the clearance between the drive flange 54 and adapter ring 58 to adjust the amplitude or degree or radial vibratory movement therebetween, clearance shims 79 may be selectively provided between the outer periphery of drive flange 54 and the inner annular surface of adapter ring 58. Also, if desired, clearance shims may be provided between the lateral adjacent faces of drive flange 54 and adapter ring 58 and/or between the lateral adjacent faces of drive flange 54 and clamp ring 74 to control relative axial movement therebetween.

Means are provided for precluding dirt, grit and the like from entering into the clearance spaces between the relative vibrating parts, such means comprising a dust-proof seal assembly, generally designated 80, having a metal inverted L-shaped housing 82 with one leg 84 thereof contiguous with the inner annular surface 86 of clamp ring 74. A seal 88 is positioned circumferentially around the periphery of shaft 50 and is contained within housing 82. In cross section, seal 88 extends from a bulging portion 90 secured to leg 84 toward spindle shaft 50 and terminates in a flexible trailing edge 92, as shown in FIG. 3. Encircling seal 88 in a circular garter spring 94 for urging the trailing edge 92 of said seal against spindle shaft 50. The entire dust-proof seal assembly is press fitted into position.

In operation as the wheel is rotating at a relatively high rate of speed, wheel 28 is advanced into the work by moving handle 24 in a downward direction. A resistance is encountered by the wheel as it engages the work effecting movement of the wheel transversely to the longitudinal axis of spindle shaft 50 as a result of the yielding action of centering strip 64 and bushings 76. This inturn breaks up the arc of contact with the work and generates an oscillating motion of the wheel within the spindle assembly. The oscillating movement of the wheel facilitates the cutting action and provides chip clearance that maintains the wheel cool and fast cutting. It should be noted that prior to the wheel contacting the work, the wheel is maintained on center or in a coaxial relationship with drive flange 54 due to the presence of centering strip 64.

A second embodiment of the vibrating spindle assembly of this invention is shown fragmentarily in section in FIG. 5 and comprises a drive flange 54' suitably threadably engaged with the threaded portion of a spindle drive shaft (not shown). For purposes of describing this embodiment, the same reference characters primed will be used to indicate parts similar to those employed in the first embodiment.

An adapter ring 58' is provided with a flange 60' which extends over the periphery of drive flange 54' and is radially spaced therefrom in accordance with the maximum amplitude of oscillation desired of the adapter ring 58' and hence the cut-off wheel 28' relative to drive flange 54'. An annular recess 62' is provided in drive flange 54' for receiving a flexible, resilient, rubber centering strip 64' disposed circumferentially about the periphery of drive flange 54' to maintain the cut-off wheel 28' and flange 54' in a coaxial relationship in the same manner and for the same purpose explained in connection with the first embodiment illustrated in FIGS. 3 and 4.

Drive flange 54' is provided with a plurality of apertures 100 circumferentially spaced therabout and extending inwardly of the forward face 102 thereof to receive a plurality of studs 104 which are threadably secured in threaded bores 106 of the adapter ring 58'. Each aperture 100 is lined with a bushing 108, preferably formed of a suitable, yieldable, cushion material such as soft rubber for example, such bushing encasing the end portion of stud 104 and permitting relative radial movement between the stud and drive flange 54'. Any suitable suitable number of apertures and corresponding studs may be employed, as desired, depending on the economics of design.

Adapter ring 58' is connected to a clamp ring 74' by means of a plurality of bolts 110 threadably received in threaded bores 112 located circumferentially about flange 60' of adapter ring 58'.

As in the embodiment first described, clearance shims may be selectively provided between the outer periphery of drive flange 54' and flange 60' of adapter ring 58' to control the amplitude of oscillation of adapter ring 58' and thereby cut-off wheel 28' relative to drive flange 54'.

A dust-proof seal assembly, generally designated 80' incorporating the same structure described and illustrated in connection with the embodiment of FIG. 3 is employed to prevent damaging foreign matter from entering into the spindle assembly. However, for mechanical convenience in facilitating the assembly operation, seal assembly 80' is inserted between an extension 114 of drive flange 54' and clamp ring 74' rather than between the clamp ring and the spindle drive shaft as shown in the first embodiment.

As a result of the present invention, an improved cut-off machine is provided for cutting through metal in an improved and more efficient manner. By the provision of a novel dust-proof seal assembly, the clearance spaces between the relative moving parts are kept free of undesirable foreign particles and contamination. This is particularly critical when the machine is used in dusty environments such as encountered in the conventional foundry.

Another advantage residing in the apparatus of this invention is the provision of a flexible centering strip which maintains the drive flange and adapter ring on center or coaxially aligned when the wheel is not engaged with the workpiece to thereby eliminate vibratory or oscillatory movement therebetween. A further advantage residing in the apparatus of this invention is the provision of clearance shims which may be selectively employed in accordance with the size, sectioning and material of the workpiece to further control vibratory motion.

Preferred embodiment of this invention having been described and illustrated in accordance with the patent statutes, it is to be realized that modifications thereof may be made without departing from the broad spirit and scope of this invention.

I claim:

1. A spindle assembly for a work tool comprising: a rotatable shaft; means for rotating said shaft; a drive member rigidly secured to said shaft; a driven member supporting a work tool; means connecting said drive member and said driven member for relative radial oscillating movement therebetween; and self-centering means for maintaining said driven member and said drive member in a coaxial relationship when said tool is out of engagement with a workpiece in which said driven member has a radial flange surrounding the periphery of said drive member at its greatest diameter and radially spaced therefrom for limiting the amplitude of radial oscillating movement between said drive member and said driven member.

2. A spindle assembly as defined in claim 1 in which said self-centering means is disposed between said radial flange of said driven member and said periphery of said drive member.

3. A spindle assembly as defined in claim 2 in which said self-centering means is a strip of yieldable rubber.

4. A spindle assembly as defined in claim 2 in which said self-centering means is a corrugated strip of metal.

5. A spindle assembly as defined in claim 1 in which the drive member has a plurality of bores therethrough and the connecting means includes a plurality of bolts connected to said driven member and extending through said bores, respectively; a plurality of yieldable bushings surrounding said bolts in said bores, respectively; said bolts having threaded end portions, respectively; and a clamp member for threadably receiving the threaded end portions of said bolts.

6. A spindle assembly as defined in claim 1 including seal means for preventing foreign matter from entering into said spindle assembly.

7. A spindle assembly as defined in claim 6 in which said seal means comprises a housing, a seal contained substantially within said housing and a spring for urging a portion of said seal against said rotatable shaft.

8. A spindle assembly as defined in claim 6 including at least one shim disposed adjacent said self-centering means between said radial flange of said driven member and said periphery of said drive member.

9. A spindle assembly as defined in claim 1 including a clamp ring having a plurality of apertures for receiving a plurality of bolts; said radial flange having a plurality of threaded bores for receiving said bolts.

10. A spindle assembly as defined in claim 9 in which the driven member has a plurality of studs extending parallel to the rotational axis of said driven member; said drive member having a plurality of apertures for receiving said studs, respectively; and a plurality of yieldable bushings surrounding said studs in said apertures, respectively.

11. A spindle assembly as defined in claim 10 including seal means disposed in said clamp ring for preventing foreign matter from entering into said spindle assembly.

References Cited

UNITED STATES PATENTS

| | | | |
|---|---|---|---|
| 2,810,239 | 10/1957 | Burleigh | 51—168 |
| 2,883,805 | 4/1959 | Limbers | 51—168 |
| 2,981,300 | 4/1961 | Peterson et al. | 51—168 X |
| 3,036,412 | 5/1962 | Tocci-Guilbert | 51—168 |
| 3,141,268 | 7/1964 | Seidel et al. | 51—168 |
| 3,367,068 | 2/1968 | Dooley | 51—168 |
| 3,392,616 | 7/1968 | Hensley | 51—378 X |

FRANK T. YOST, Primary Examiner

U.S. Cl. X.R.

51—168, 378; 83—666; 143—155; 144—238